(12) United States Patent
Ochiai et al.

(10) Patent No.: US 6,329,772 B1
(45) Date of Patent: Dec. 11, 2001

(54) CONTROL APPARATUS OF HYBRID VEHICLES

(75) Inventors: Shinobu Ochiai; Minoru Suzuki, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/643,949

(22) Filed: Aug. 23, 2000

(30) Foreign Application Priority Data

Aug. 25, 1999 (JP) .................................................. 11-238949

(51) Int. Cl.[7] .................................. H02P 3/00; H02P 5/00
(52) U.S. Cl. .......................... 318/139; 318/140; 180/65.3; 180/165; 180/170; 123/335
(58) Field of Search ..................................... 318/139, 140; 180/65.2, 65.3, 65.4, 65.6, 65.8, 165, 170; 123/330–335

(56) References Cited

U.S. PATENT DOCUMENTS

| | | | |
|---|---|---|---|
| 6,122,588 | * 9/2000 | Shehan et al. | 180/170 |
| 6,135,914 | * 10/2000 | Yamaguchi et al. | 180/65.2 |
| 6,137,250 | * 10/2000 | Hirano et al. | 318/139 |

* cited by examiner

Primary Examiner—Marlon T. Fletcher
(74) Attorney, Agent, or Firm—Arent Fox Kintner Plotkin & Kahn, PLLC

(57) ABSTRACT

A control apparatus of a hybrid vehicle is provided capable of protecting the peripheral components of the motor from a voltage generated by regeneration during travelling the vehicle. When the motor control device 5 detects failures of the motor system such as current sensors 13, 15, and 17, voltage sensors 14, and 16, and a failure of the motor 2 (breakage of the winding), the motor control device 5 stops the motor control by turning off the on-state main contactor and by electrically disconnecting the connection between the power drive unit 7 and the battery 3. At the same time, the motor control device 5 outputs a signal about the failure of the motor system to the engine control device 4. When the failure is detected by the motor control device 5 and when the main contactor 11 is in the off state, the engine control device 4 controls the engine such that the engine rotation speed is maintained below 5000 rpm.

1 Claim, 4 Drawing Sheets

CONTROL APPARATUS OF HYBRID VEHICLES

BACKGROUND OF THE INVENTION

1. Field of the Invention

The present invention relates to a control apparatus for hybrid vehicles, and particularly relates to a control apparatus for hybrid vehicles for restricting the rotation speed of the engine when a failure of component related to the motor control is encountered.

2. Background Art

Electric cars are currently under development in order to reduce the discharge of exhaust gas into the atmosphere. However, the cruising range of electric cars driven only by a motor is limited by the capacity of the battery which stores the electric energy. If sufficient cruising range is desired, very large batteries are required, which seriously degrades the travelling performance of the car.

Hence, hybrid cars have become the subject of intensive development, because it is possible for hybrid cars to provide both a large cruising range, and good driving performance by using both an engine driven by the combustion of fossil fuel and a motor activated by a comparatively small battery.

Parallel-type hybrid vehicles, one type of hybrid vehicles, realize good driving performance, reduced emission of exhaust gas, and reduced fuel consumption by switching the driving modes from an engine drive mode to a motor drive mode according to the driving conditions.

That is, parallel-type hybrid cars travel using the engine only, when travelling using the engine is efficient, and the motor assists the engine or the motor drives the vehicle without the engine when the travelling conditions are not conductive to efficient use of the engine, such as when accelerating or when travelling slowly.

In addition, when braking the vehicle, the motor is operated as a generator for recovering the kinetic energy of the vehicle and energy loss can be prevented and the fuel consumption can be reduced.

In order to control the above described motor, it is necessary to provide a variety of components such as a control apparatus for controlling the motor, a signal line for transmitting signals from the control apparatus, sensors for detecting voltages or electric currents between the motor and the battery and for transmitting these values to the control apparatus. Furthermore, the above described control apparatus comprises a CPU (Central Processing Unit) and a memory, and the control function is realized by executing a program for the functions of the control apparatus. These components, apparatuses, and software related to the motor are called a motor system, and are indispensable for driving the motor.

When a failure is encountered in the motor system while driving hybrid cars, and when the motor cannot be controlled normally, it is necessary to stop the motor immediately and to switch to a driving mode using only the engine. In this case, the peripheral components around the motor must be protected from the voltage generated by regeneration by the motor.

SUMMARY OF THE INVENTION

It is therefore an object of the present invention to provide a control apparatus for a hybrid vehicle which, when the motor system of the hybrid vehicle is failed, allows the hybrid vehicle to continue travelling while protecting the peripheral components of the motor from the voltage generated due to the regeneration of the motor.

In order to achieve the above described objective, the present invention provides a control apparatus for a hybrid vehicle comprising an engine (1); a motor (2) for assisting the driving power of the engine; a battery device (the battery 3 in the present embodiment) being charged by electric energy generated by generation by the motor; a contactor (the precharge contactor 10 and the main contactor 11 in the present embodiment) disposed between the motor and the battery device; and an inverter (the power drive unit 7 in the present embodiment) provided between the motor and the contactor; wherein, when a component (such as the motor 2, current sensors 13, 15, 17, and voltage sensors 14 and 15 in the present embodiment) related to the motor control fails, the control apparatus (the engine control device 4 and the motor control device 5 in the present embodiment) of the hybrid car turns off the contactor and restricts the rotation speed of the engine to below a particular rotation speed of the engine (less than 5,000 rpm in the present embodiment) by which the voltage generated by regeneration by the motor is restricted to below the withstand voltage of the inverter.

Thereby, when a failure is encountered in the motor system, the motor drive is stopped by turning off the contactor and the vehicle travels using only the engine. In addition, by limiting the rotation speed of the engine (to less than 5,000 rpm) in which the voltage generated by regeneration of the motor can be suppressed to below the withstand voltage of the motor related components.

DESCRIPTION OF THE INVENTION

Hereinafter, a control apparatus of a hybrid vehicle according to one embodiment of the present invention will be described with reference to the attached drawings.

Figure 1:
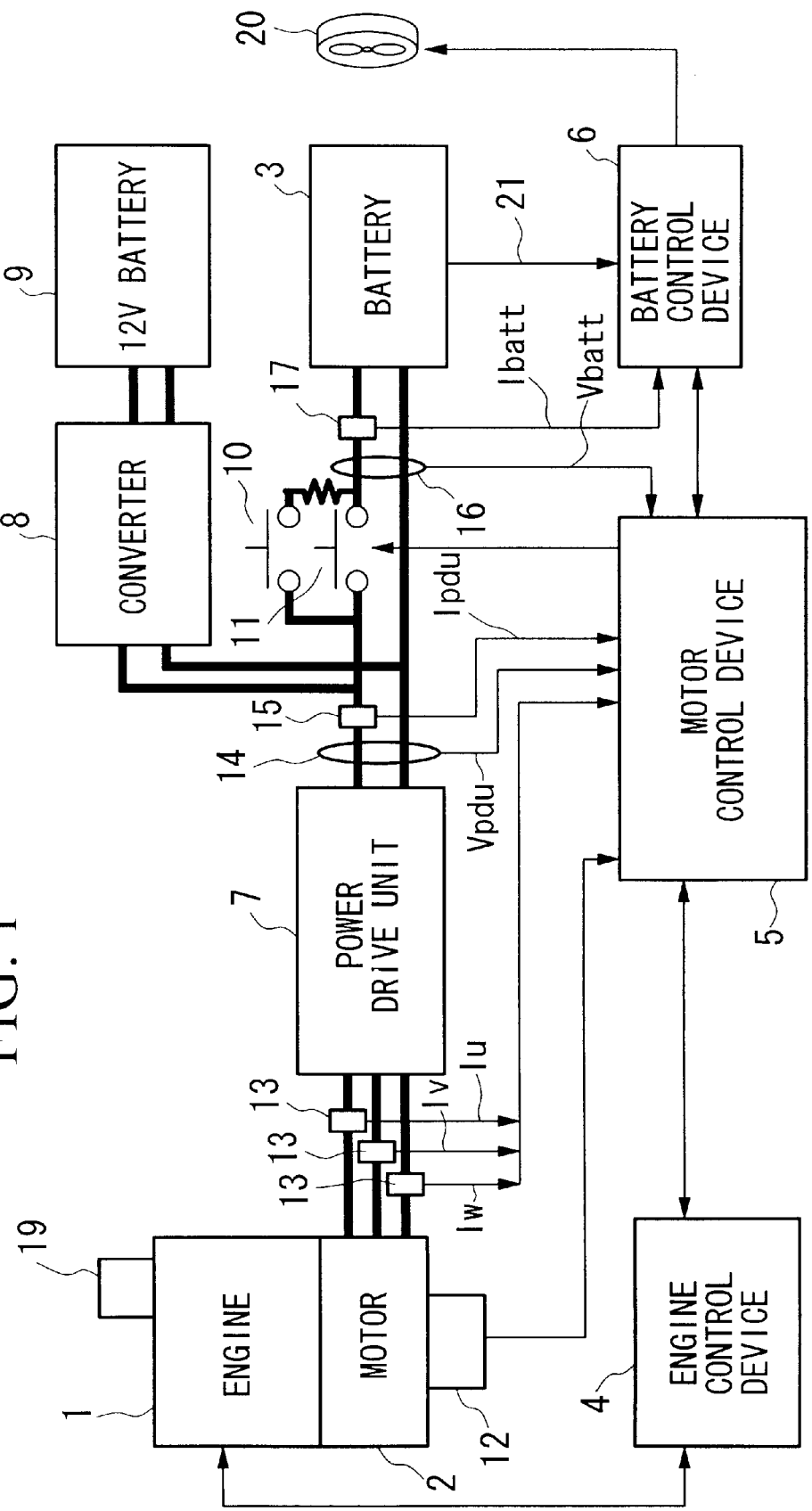
FIG. 1 is a block diagram showing the entire structure of a parallel hybrid vehicle, which is a type of hybrid vehicle, according to one embodiment of the present invention.

FIG. 1 is a block diagram showing the entire structure of a parallel hybrid vehicle, which is a type of hybrid vehicle, according to one embodiment of the present invention. In FIG. 1, the numeral 1 denotes an engine actuated by the combustion of the fuel, and the numeral 2 denotes a motor actuated by electric energy for use together with the engine 1. The driving power of both the engine 1 and the motor 2 is transmitted to the driving wheels (not shown) through a transmission (not shown) constituted by an automatic transmission or a manual transmission.

At the time of deceleration of the hybrid vehicle, the driving force is transmitted from the driving wheels to the motor 2, and the motor functions as a generator. The motor 2 recovers the kinetic energy of the car as electric energy, and charges the battery 3, which will be described later. It is noted that a generator may be provided in addition to the driving motor 2 for charging the battery 3.

Here, the battery 3 is constituted as a high voltage battery by connecting in series a plurality of modules, each of which is a battery unit formed by connecting in series a plurality of cells. The numeral 19 denotes a starter used exclusively for starting the engine.

The numeral 4 denotes an engine control device, which monitors the rotation speed of the engine, the vehicle speed, and so on, and judges the vehicle travelling mode such as a motor regeneration mode, an assist mode, and deceleration mode. The engine control device 4 determines the assist/regenerative amount for each of the above described mode and outputs information including the vehicle travel modes and the assist/regenerative amount to the motor control device 5. When the motor control device 5 receives information from the engine control device 4, then the motor control device 5 controls the motor 2 for driving/regenerating the motor as instructed by the engine control device 4.

The numeral 6 denotes a battery control device, which calculates the state of charge (SOC) of the battery 3. The battery control device 6 also controls the fan 20 provided near the battery 3 so as to maintain the temperature of the battery 3 below a predetermined temperature.

The engine control device 3, the motor control device 4, and the battery control device 6 are constituted by a sequencer or a CPU and a memory device, and the functions of these control devices are realized by executing programs for carrying out the functions.

The numeral 7 denotes a power drive unit, which is constituted by connecting three units in parallel and one unit is formed by connecting two switching elements in series. These switching elements in the power drive unit 7 are turned on or off by the motor control device 5; thereby, the direct current component supplied to the power drive unit 7 from the high voltage battery 3 is supplied to the motor 2 through three phase lines.

The numeral 9 is a 12V battery for driving a variety of auxiliaries, and this 12V battery is connected to the battery 3 through a converter 8. This converter 8 reduces the voltage from the battery 3 and supplies the voltage to the 12V battery 9.

The numeral 10 denotes a precharge contactor, and the numeral 11 denotes a main contactor, and the battery 3 and the power drive unit 7 are connected through these contactors 10 and 11. The precharge contactor 10 and the main contactor 11 are turned on or off by the motor control device 5.

The numeral 12 denotes a sensor for calculating the location and the number of rotations of the motor 2, and the numeral 13 denotes current sensors for detecting the current Iu, Iv, and Iw flowing in the three phase lines. The detected values obtained by these sensors are input into the motor control device 5.

The numeral 14 denotes a voltage sensor for detecting voltage Vpdu at the input portion of the power drive unit 7, and the numeral 15 denotes a current sensor for detecting current Ipdu input into the power drive unit 7. The numeral 16 denotes a voltage sensor for detecting the voltage Vbatt at the output side of the battery 3. The voltage values and current values obtained by these voltage sensors and current sensors (14 to 16) are input into the motor control device 5.

The numeral 17 is a current sensor for detecting the current Ibatt flowing in a line output from the battery 3 and the detected current is input into the battery control device 6.

As described above, those sensors 16 and 17 detect the voltage Vbatt and the current Ibatt output from the battery 3, and sensors 14 and 15 detect the voltage Vpdu and the current Ipdu input into the power drive unit 7 through the contactors 10 and 11. The current Ipdu detected by the current sensor 15 is a current, which is formed by subtracting the current from the converter 8 from the current from the battery.

Hereinafter, an operation of the control apparatus of the hybrid vehicles constituted as described above is described briefly.

The state of charge of the battery is calculated by the battery control device 6 using the current Ibatt and the voltage Vbatt and the battery control device 6 outputs the resultant calculated value to the motor control device 5.

The engine control device 4 determines the control modes (such as assist, regeneration, start, deceleration etc.) and the required electric power for the motor, based on the state of charge, the rotation speed of the engine, the degree of the throttle opening, the engine torque, and the real torque of the motor, and the thus determined mode and the required electric power for the motor are output to the motor control device 5.

When the motor control device 5 receives the mode and the required electric power for the motor 2 from the engine control device 4, the motor control device 5 conducts a feedback of the required electric power such that the input side electric power of the power drive unit 7 (on the side of the voltage sensor 14 and the current sensor 15) coincides with the thus received required electric power and calculates the torque. Furthermore, the motor control device 5 conducts a feedback of the required electric power such that the electric power of the battery 3 (on the side of the voltage sensor 16 and the current sensor 17) coincides with the required electric power at the time of cruising and calculates the torque. When the torque is obtained, the motor control device 5 controls the power drive unit 7 according to the thus calculated torque. In addition, when starting the engine, the motor control device 5 controls the start of the engine by the motor 2 by controlling the power drive unit 7.

When the motor control device 5 receives the real torque from the power drive unit 7, the motor control device outputs the real torque to the engine control device 4.

The engine 1, the motor 2, and the battery 3 are controlled for driving the hybrid vehicle, by the engine control device 4, the motor control device 5, and the battery control device 6 which execute the above described processing at predetermined timings.

Next, detection of a failure encountered in the motor system is described. Here, the motor system includes the motor and components for controlling the motor. Practically, the motor system includes components such as the power drive unit 7, the voltage sensors 14 and 16, current sensors 13, 15, and 17, three phase lines connecting the motor 2 and the power drive unit 7, and the motor 2. The failure of the motor system is detected by the following methods.

The breakage of the above described three phase lines can be detected by the following method. Generally, each current Iu, Iv, or Iw flowing in each three phase line has the same peak current value. However, if one line fails, the peak current flowing in each line becomes different. Thus, while detecting each current value flowing in each line, if a peak current out of these three phase lines Iu, Iv, and Iw changes, the motor control device 5 judges that a failure of the three phase lines has occurred, and outputs a signal indicating a failure of the motor system to the engine control device 4.

In general, the sum of the respective currents of these three phase lines is zero. However, when a current sensor 13 fails, the total peak current Iu+Iv+Iw of the three phase lines detected by current sensors 13 is not shown as zero. Thus, when the total current of these three phase currents detected by these current sensors 13 is not shown as zero, the motor control device 5 judges that a current sensor 13 has failed and a signal indicating a failure of the motor system is output to the engine control device 4.

A failure of the voltage sensor 14 or 16 can be detected by the motor control device 5 when the voltage Vpdu on the input side of the power drive unit 7 detected by a voltage sensor 14 differs from the voltage Vbatt detected by the voltage sensor 16.

Similarly, a failure of the current sensor 15 or 17 is detected by the motor control device 5 when the current Ipdu input into the power drive unit 7 detected by the current sensor 15 differs from the current Ibatt detected by the current sensor 17, considering the current flowing into the converter 8.

A breakage of the transmission line for transmitting the electric power between the power drive unit 7 and the battery 3 can be detected by monitoring the voltages and currents detected by sensors 14 to 17.

As described above, the motor control device 5 always monitors the voltage values or current values transmitted from voltage sensors 14 and 16 and current sensors 15 and 17. When those sensors detect anomalous values, the motor control device 5 judges the occurrence of a failure in the motor system and outputs the failure signal to the engine control device 4.

When the motor system has failed and when it is not possible to control the motor normally, a variety of processes are executed by the motor control device 5 and the engine control device 4. Such processes will be described with reference to FIGS. 2 and 3.

Figure 2:
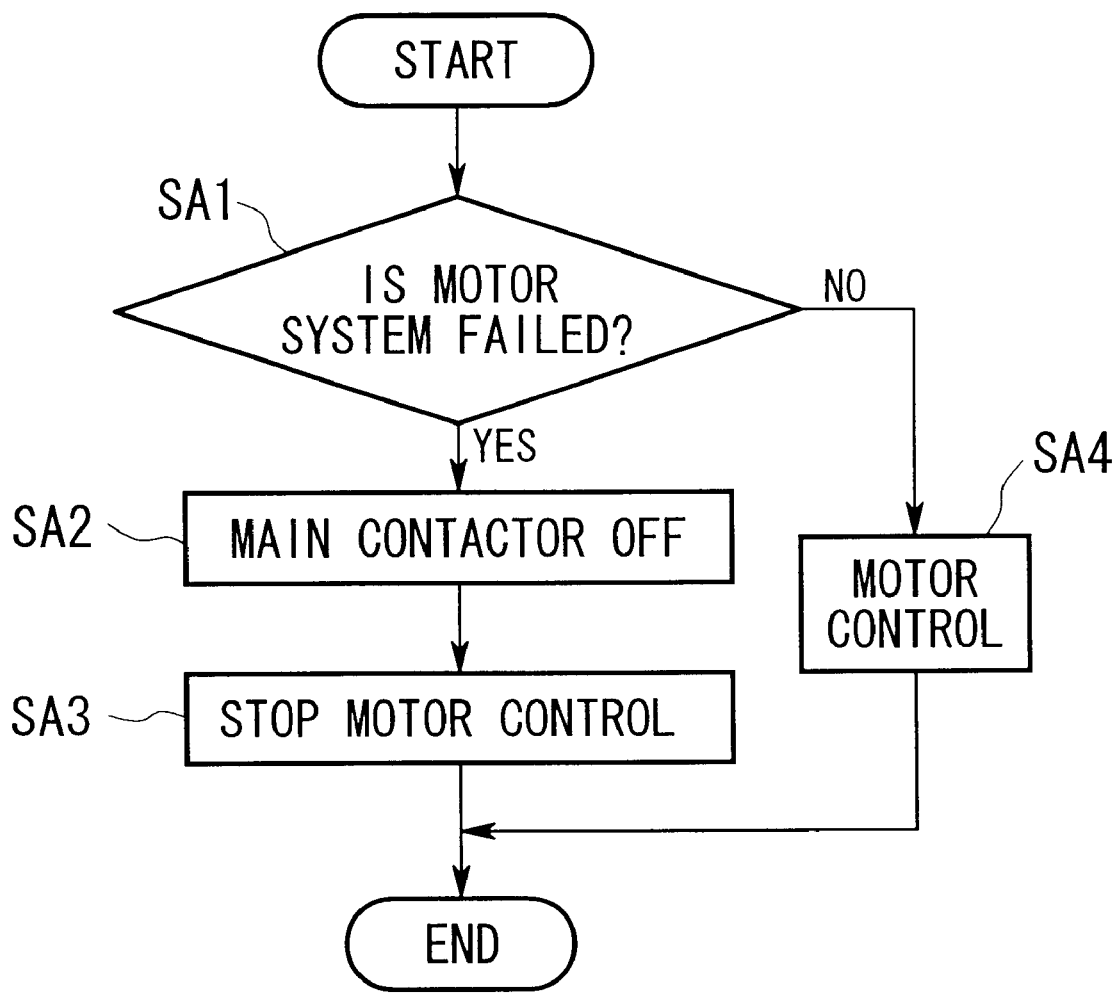
FIG. 2 is a flow-chart showing an operation of the motor control apparatus in the embodiment of the present invention.

First, the processing conducted by the motor control device 5 for the failure of the motor system is described with reference to FIG. 2.

As described above, the motor control device 5 is always monitoring the voltages and currents transmitted by those voltage sensors and current sensors. In step SA1, when an abnormal value is observed in these monitoring data, the power drive unit 7 and the battery 3 are disconnected by turning off the main contactor 11 (step SA2), and the motor control is stopped. When the failure of the motor system is detected in step SA1, the motor control device 5 executes the above described processing and outputs the signal concerning occurrence of the failure of the motor system to the engine control device 4.

In contrast, when a failure of the motor system is not detected in step SA1, the normal control operation of the motor continues. That is, the motor control device 5 receives the required torque from the engine control device 4 and controls the power drive unit corresponding to the required torque.

As described above, when detecting the failure of the motor system, the motor control device 5 turns off the main contactor 11; and thereby, stops the control of the motor, that is, the control of the power drive unit 7.

However, even after turning off the main contactor 11 and stopping the control of the power drive unit 7, the motor 2 still rotates at the same rotational speed, and the motor 2 generates a voltage corresponding to the rotational speed due to the regeneration.

As described above, if the regeneration by the motor 2 continues, while the main contactor is turned off, that is, while the battery 3 and the power drive unit 7 are disconnected, a voltage exceeding the withstand voltage of the power drive unit 7 is applied to the power drive unit 7. Consequently, the power drive unit 7 is subject to breakdown or a reduction of the service life time. Thus, it becomes necessary to prevent breakdown or a reduction of the service life of the power drive unit 7 by restricting the voltage generated by regeneration to below the withstand voltage of the power drive unit 7.

Hereinafter, a control operation for restricting the rotation speed of the engine executed by the engine control device 4 will be described with reference to FIG. 3.

In step SB1, a judgement is made as to whether the failure of the motor system is detected. That is, a judgement is made as to whether the main contactor 11 is in the off state. When a failure is detected (the main contactor is in the off state), the flow goes to step SB2 and the upper limit of the engine rotation speed is set to 5000 rpm.

In contrast, when a failure of the motor system is not detected in step SB1, the flow goes to step SB3, wherein the upper limit of the engine rotation speed is set to 7000 rpm.

Next, when the upper limit of the engine rotation speed is set in steps SB2 or in step SB3, a judgement is made in step SB4 as to whether the present engine rotation speed exceeds the above described upper limit of the engine rotation speed. When the present engine rotation speed exceeds the above described upper limit of the engine rotation speed, a fuel cut to stop the fuel supply to the engine is set in step SB5, and the engine rotation speed is reduced. Thereby, the motor rotation speed is also reduced, which results in reducing the voltage generated by regeneration by the motor 2.

As described above, the engine control device 4 monitors the engine rotation speed at a predetermined interval, and if an anomalous value is detected, the upper limit of the engine rotation speed is set to 5000 rpm.

In contrast, when a failure of the motor system is not detected in step SB1, the flow goes to step SB3, wherein the upper limit of the engine rotation speed is set to 7000 rpm.

Once the upper limit of the engine rotation speed is determined in step SB2 or in step SB3, a judgement is made in step SB4 as to whether the present engine rotation speed is equal to or higher than the above described upper limit of the engine rotation speed. When the present engine rotation speed is higher than the upper limit, a fuel cut, which corresponds to an operation to stop the fuel supply to the engine, is executed and the engine rotation speed is reduced. Thus, the motor rotational speed is also reduced, which results in reducing the voltage generated by regeneration.

As described above, the engine control device 4 always monitors the engine rotation speed, and when an anomalous value is detected, the upper limit of the engine rotation speed is set at 5000 rpm, and the engine control device 4 restricts the engine rotation speed below the upper limit of the engine rotation speed.

The motor 2 according to the present embodiment has the capacity of generating 60V per 1000 rpm of the engine rotation speed. The voltage obtained by the generation by the engine rotation speed of 5000 rpm is (5000/1000)*60= 330 V, which implies that the present embodiment restricts generation of the motor such that a voltage of more than 330 V is not applied to the power drive unit 7. Here, it is defined that the voltage of 330V does not exceed the withstand voltage of the power drive unit.

Accordingly, it is possible to prevent a breakdown or reduction of the service life of the power drive unit 7 by restricting the engine rotation speed.

Figure 3:
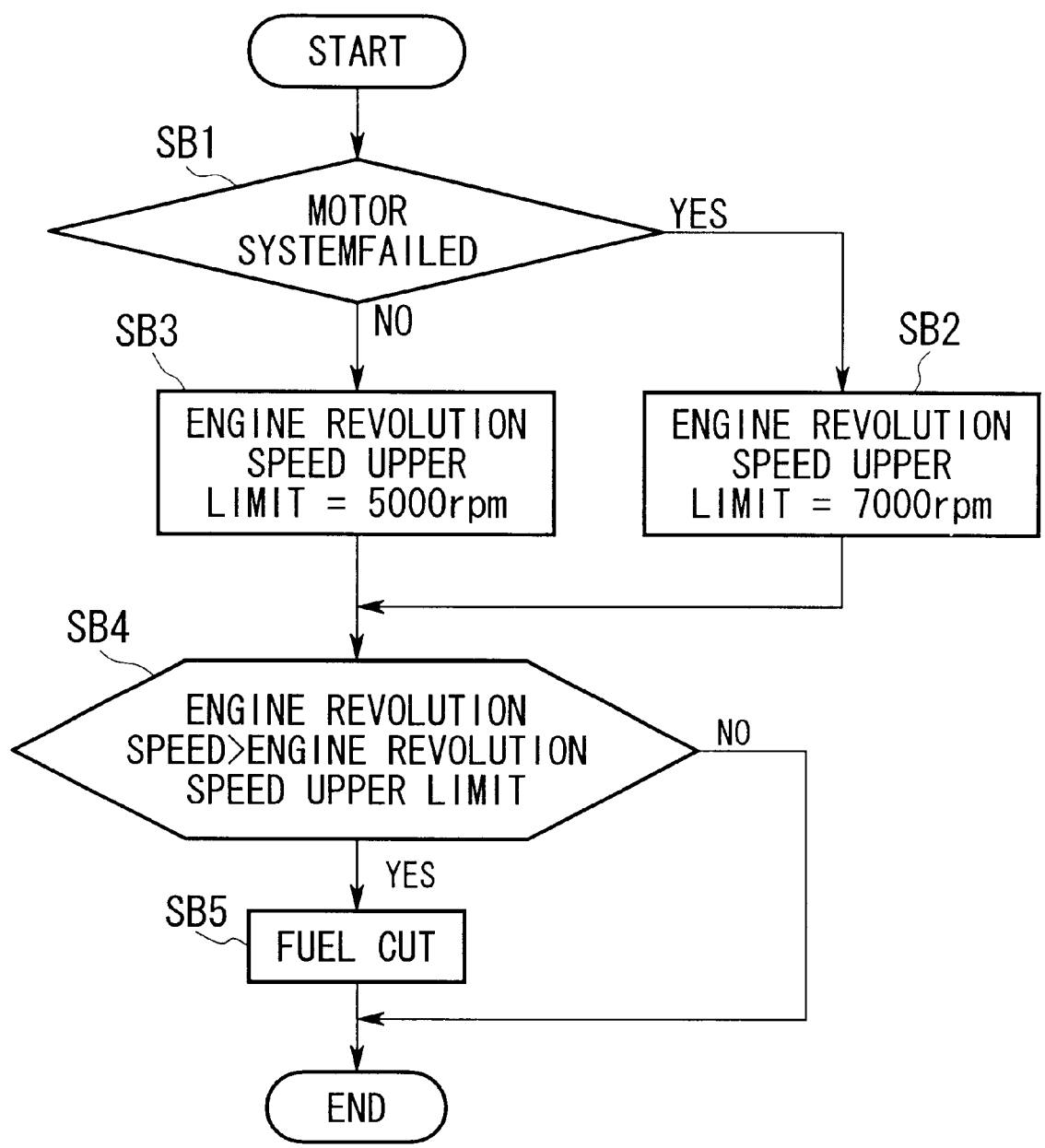
FIG. 3 is a flow-chart for explaining the operation of the engine control apparatus of the present embodiment of the present invention.

The value of 7000 rpm, which appears in "the upper limit of the engine rotation speed=7000 rpm" in step SB3 in FIG. 3, is defined in order to protect the engine, and when the vehicle travels normally, this value is set as the upper limit of the engine rotation speed.

Figure 4:
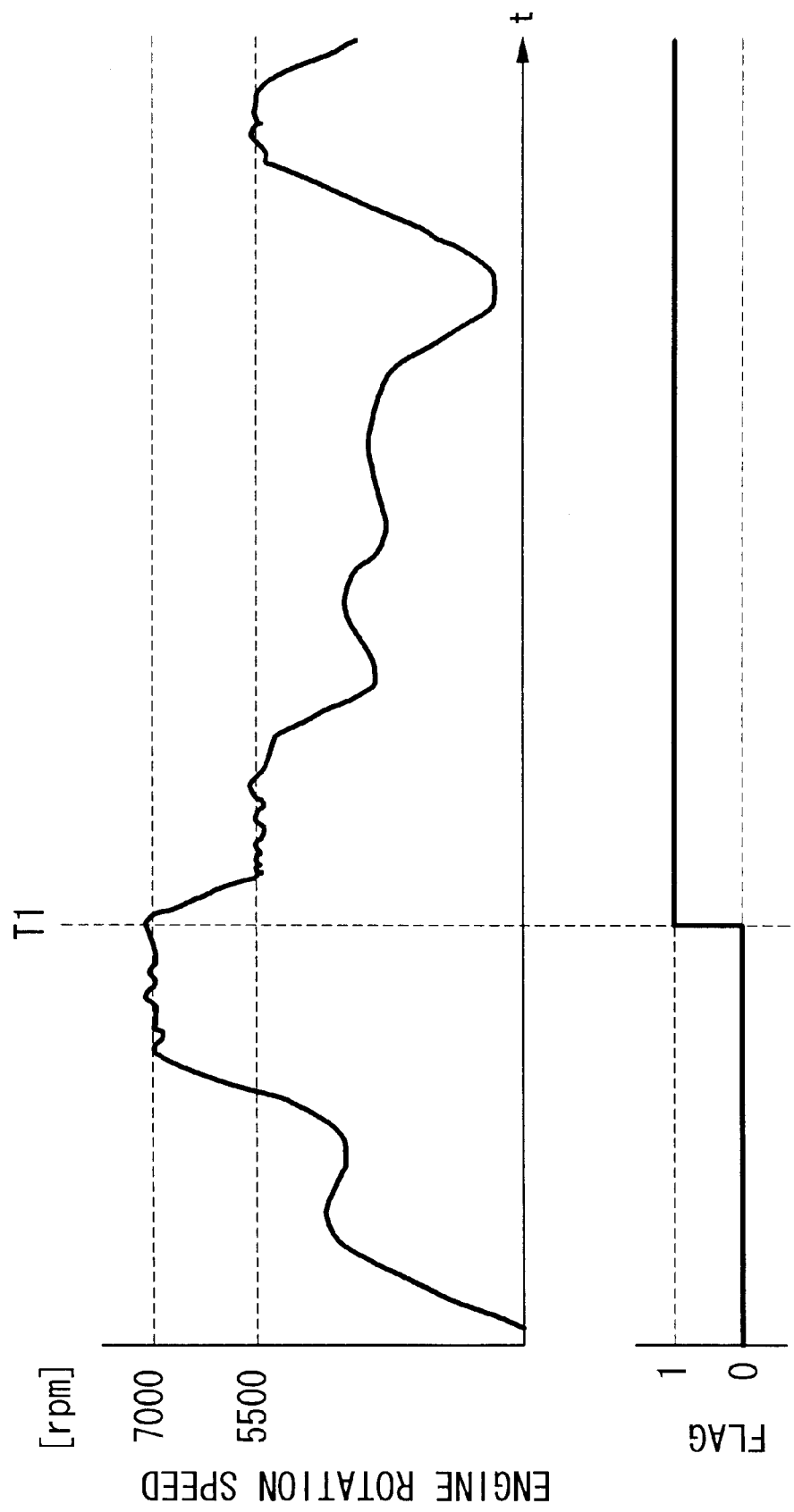
FIG. 4 is a diagram showing the change of the engine rotation speed.

The transition of the engine rotation speed when a failure of the motor system occurs during travelling is shown in FIG. 4. In FIG. 4, the longitudinal axis shows the engine rotation speed, and the abscissa shows time. The flag shown below the diagram of the engine rotation speed represents a flag for requesting the restriction of the engine rotation speed. When the contactors 10 and 11 are in the off state, the flag is set to "1", which requests that the engine control device 4 carry out a control operation to restrict the engine rotation speed (after the time T1).

It is assumed that a failure of the motor is detected by the motor control device at the time T1 shown in FIG. 4. When detecting a failure of the motor system, the motor control device 5 turns off the main contactor 11 following the flow-chart shown in FIG. 2.

The engine control device 4 starts restricting the engine rotational speed after the motor control device 5 turns off the main contactor 11. Since the upper limit of the engine rotation speed is set to 5000 rpm, the engine rotation speed after the time T1 changes as shown in FIG. 4.

In addition, since the main contactor 11 is turned off at the time T1, the flag is set to "1"; which provides a request that the engine control device 4 execute a control to restrict the engine rotation speed.

As described above, when a failure of the motor system is detected, the control apparatus of the hybrid vehicle according to the present embodiment is capable of preventing the components of the motor system from being broken by the voltage generated by regeneration of the motor by turning off the switching device and by restricting the engine rotation speed so as not to generate a regenerative voltage higher than the withstand voltage of the components.

When a failure is detected in the motor system, driving of the motor is stopped by disconnecting the contactors, and the vehicle's driving mode is set to drive only by the engine. At the same time, the engine rotation speed is restricted such that the voltage generated by regeneration by the motor can be maintained below the withstand voltage of the components in the motor system in order to protect these components from being subjected to the voltage breakdown and to a reduction of their service life.

What is claimed is:

1. A control apparatus for a hybrid vehicle comprising an engine;

a motor for assisting the driving power of the engine;

a battery device which is charged by a voltage generated by regeneration of said motor;

a contactor connected between the motor and the battery device; and a power drive unit provided between the motor and the contactor;

wherein, when a component related to the motor control fails, a control apparatus of said hybrid vehicle turns off the contactor and restricts the rotation speed of said engine to a rotation speed below an engine rotation speed at which the voltage generated by regeneration by the motor is restricted to a voltage below a withstand voltage of said power drive unit.

* * * * *